United States Patent

Swanson

[11] 4,010,527

[45] Mar. 8, 1977

[54] TEXTILE DRAFTING ROLL ASSEMBLY

[76] Inventor: Kenneth P. Swanson, 2624 Sea Island Drive, Fort Lauderdale, Fla. 33301

[22] Filed: May 6, 1976

[21] Appl. No.: 683,735

[52] U.S. Cl. .............................. 29/116 R; 308/215; 308/217

[51] Int. Cl.² .......................................... B21B 13/02

[58] Field of Search .................. 29/116 R, 116 AD; 308/215, 217, 205, 206

[56] References Cited

UNITED STATES PATENTS

| 137,415 | 4/1873 | Burr .................................. 308/217 |
| 506,009 | 10/1893 | Mattison ........................... 308/206 |
| 1,443,915 | 1/1923 | Fynn ................................ 308/215 X |
| 1,806,279 | 5/1931 | Booth ............................... 308/217 |
| 2,716,780 | 9/1955 | Swanson ........................... 29/116 R |
| 3,228,088 | 1/1966 | Schaeffler et al. ............... 29/116 R |
| R24,687 | 8/1959 | Swanson ........................... 29/116 R |

*Primary Examiner*—Alfred R. Guest
*Attorney, Agent, or Firm*—Bailey, Dority & Flint

[57] ABSTRACT

A textile drafting roll assembly is illustrated wherein a cot carrying sleeve has a bearing race intermediate internally enlarged end portions for accommodating circumferentially spaced double roller bearings, sealing means being carried within the enlarged end portions retaining the roller bearings and excluding dirt and lint. A bearing cage is provided for receiving the roller bearings through spaced peripheral openings.

14 Claims, 2 Drawing Figures

TEXTILE DRAFTING ROLL ASSEMBLY

BACKGROUND OF THE INVENTION

The rolls of a spinning frame and the like used in the drafting system for attenuating a textile strand must possess long wearing characteristics and be free from tendency to rock on the shaft as may develop if there is excessive play in the bearing. The stability of the rolls of a textile drafting system is especially important since the strand, which must be positively controlled at all times, is relatively small and during the drafting process is traversed back and forth across the surface of the roll to prevent excessive wear, as may cause grooving of the roll. Any departure from true axial alignment of the roll results in improper handling of the yarn and loss or variation in the tension exerted by the roll upon the fibers of the strand which would produce thick and thin spots in the yarn as a result of uneven drafting.

Since the surface of a cot or other roll cover must be buffed down periodically in order to retain a true surface, it is sometimes necessary to replace the cot when it becomes excessively thin or worn as a result. It is therefore necessary to take the roll apart and it is desirable that the various parts may be assembled and disassembled conveniently. If ball bearings are used there is a tendency to wear a groove in the race or other surface containing the ball bearings. Such has a tendency to produce excessive shake or rock in the bearings.

In view of the hostile environment wherein such rolls operate, due to the lint laden atmosphere of the mill, it is important that the bearings be sealed against entry of the lint and dirt. Many efforts have been made to more nearly satisfy the requirements for such rolls. For example, U.S. Pat. No. Re. 24,687 illustrates a simplified construction wherein ball bearings are sealed within enlarged ends of a cot carrying sleeve. A more complicated construction wherein the length of the bearing surface is increased through the use of parallel rows of roller bearings is illustrated in U.S. Pat. No. 3,228,088.

Accordingly, it is an important object of the invention to minimize shake or rock in the rolls of a drafting system by providing a long area of bearing surface contact. Such a contact may be afforded by double roller bearings which may be readily installed in a simplified construction and which will provide stability while preventing excessive wear.

Another important object of the invention is to provide an improved seal or barrier against encroachment by the lint laden atmosphere of the mill.

Another important object of the invention is to provide a drafting system roll assembly of inexpensive rugged construction which may be readily assembled and disassembled.

BRIEF DESCRIPTION OF THE INVENTION

It has been found that an improved drafting roll assembly may be provided by utilizing a cylindrical sleeve for carrying the cot and the like, the sleeve having a central race defined by enlarged internal ends for accommodating roller bearings. Sealing means may be fixed to the shaft within the enlarged end portions for retaining the roller bearings and excluding lint and dirt. A special bearing cage is also contemplated for positioning the roller bearings employing spaced disks having circumferentially spaced peripheral openings for receiving the bearings. The sealing elements may provide an inner race for the bearings and retain a sealing ring to guard against entry of lint and dirt and making it possible to provide bearings which require little or no lubrication.

BRIEF DESCRIPTION OF THE DRAWING

The construction designed to carry out the invention will be hereinafter described, together with other features thereof.

The invention will be more readily understood from a reading of the following specification and by reference to the accompany drawing forming a part thereof, wherein an example of the invention is shown and wherein.

DESCRIPTION OF A PREFERRED EMBODIMENT

Figure 1:
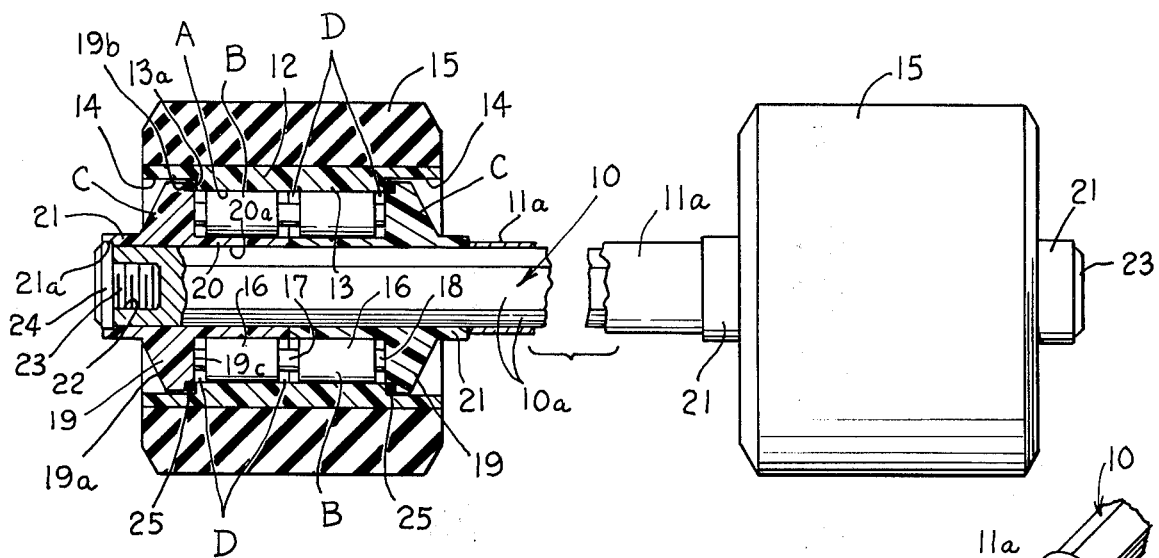
FIG. 1 is a side elevation, partially in section illustrating a drafting roll assembly constructed in accordance with the invention.

The drawing illustrates a top roll assembly for mounting a cot and the like on a shaft for use on a spinning frame and the like. A sleeve carrying the cot thereon has a bearing race A intermediate internally enlarged end portions. A plurality of circumferentially spaced roller bearings B are carried within the bearing race. Each roller bearing has a pair of spaced aligned rollers separated by an enlarged intermediate portion. Sealing means C are carried within the enlarged end portions retaining the roller bearings within the bearing race and excluding dirt and lint. A bearing cage is provided for positioning the roller bearings having a pair of retaining disk members D with circumferentially spaced seats for rotatably mounting each roller adjacent its ends. Connecting means E are provided for assembling respective pairs of retaining disk members, a disk member of each pair being in back to back relation intermediate the rollers when positioning the roller bearings. The seats open at the outer periphery of the disks for receiving the bearing members.

Figure 2:
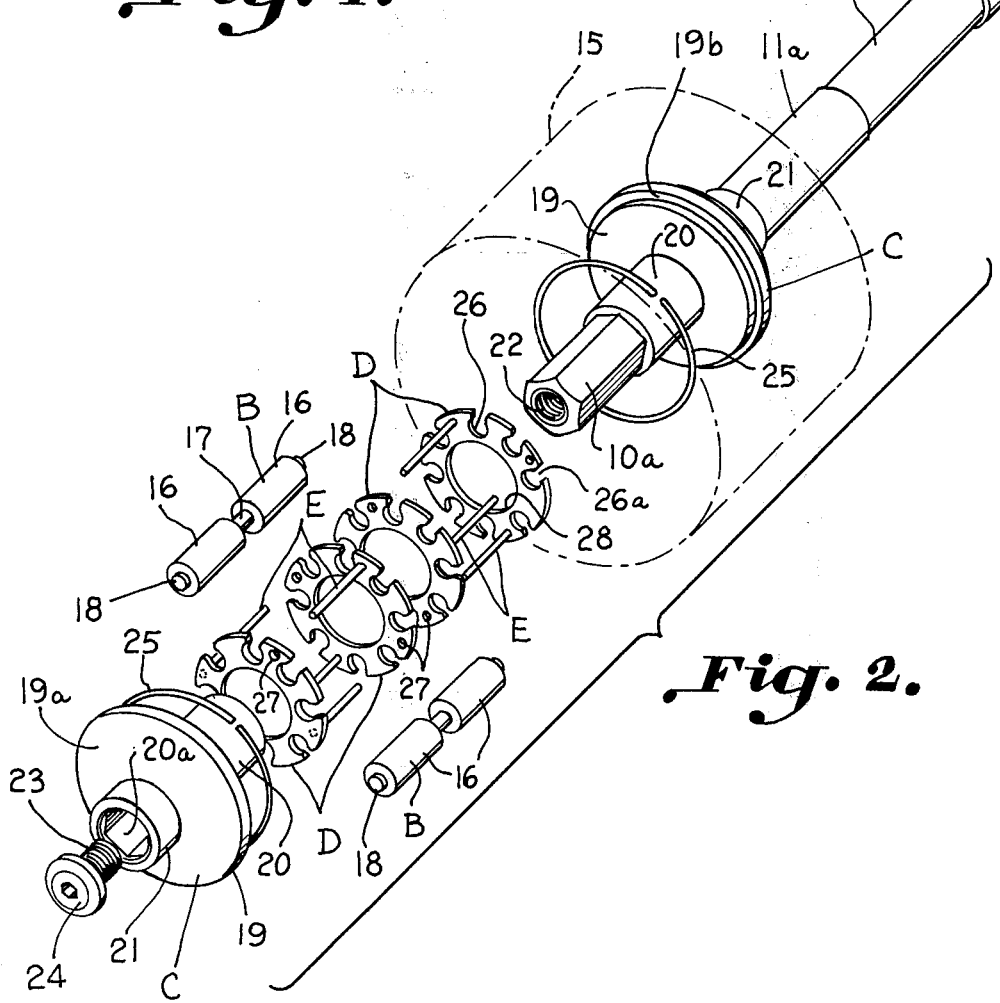
FIG. 2 is an exploded perspective view further illustrating the components of the assembly of FIG. 1.

Referring more particularly to FIG. 1, it will be noted that a shaft is illustrated in the form of a top roll arbor which is broadly designated at 10. The shaft 10 is polygonal in cross section possessing flats 10a for positioning receiving complementary portions of the bearing assembly against rotation. While the drafting roll illustrated is a top roll having a roll in the form of a cot, it is to be understood that the invention may be utilized in connection with other textile rolls and, in particular, those of a drafting system. The arbor has an enlarged central cylindrical sleeve 11 (FIG. 2) positioned between spacers 11a upon which sealing means 21 are abutted on remote ends thereof.

The sleeve 12 is preferably constructed of a suitable molded plastic and provides an outer cylindrical race A on an enlarged portion 13 which defines shoulders 13a at each end thereof, as well as enlarged internal cylindrical portions 14 adjacent each end. A cot 15 is carried as by a pressed fit by the sleeves 12 adjacent each end of the shaft. The cot is illustrated as being constructed of the usual somewhat deformable material although rolls of any desirable type may be utilized.

The circumferentially spaced roller bearings B provide an axially spaced double row of circumferentially spaced rollers 16. The rollers 16 are illustrated as having an enlarged integral intermediate portion in the form of a shaft 17. Outwardly projecting enlarged stub shafts 18 are provided at each end of the rollers 16.

Thus, the rollers 16 are axially aligned. Circumferential spacing is provided for the double rollers within the bearing race A provided within the sleeve 12.

Sealing means C are carried within the enlarged end portions 14 for retaining the roller bearings within the bearing race and excluding dirt and lint. The sealing means C is illustrated as including a plastic molded element having an outwardly extending peripheral annular flange 19 which tapers radially inwardly as at 19a toward an opposed vertical wall 19c. An inwardly extending axial annular flange 20 is molded integrally with the radial flange 19 and provides an internal race for the roller bearings 16. The shaft 10 is received within a bore 20a within the flange 20 for the purpose of receiving the shaft and carrying the sealing element C thereon against rotation. The sealing element further includes an outwardly extending flange 21 having an internal groove 21a adjacent the free end thereof. An internally threaded portion 22 of the shaft receives an externally threaded portion 23 of a cap screw which includes an enlarged head portion 24 to be received with the groove 21a for maintaining the parts in assembled position. The sealing means further contemplates an internal groove 19b which is adjacent the periphery of the flange 19 which faces inwardly toward the internal shoulders formed by the enlarged portion of the sleeve. The sealing means further contemplates the use of a hardened steel ring 25 within the internal inwardly facing groove 19b. If desired, lubricating means may be provided having a threaded grease fitting, in lieu of the cap screw, and suitable passageways in the shaft leading to each of the rollers.

A bearing cage for positioning and providing circumferential spacing for the rollers 16 includes a pair of retaining disks D provided for each row of rollers. Each of the disks have spaced bearing seats 26 having outwardly extending peripheral openings 26a herein for receiving the end stub shafts 18 of the bearings therein for reception by the seats 26. The disk members are preferably constructed of molded plastic which are somewhat deformable permitting the stub shafts 18 to be pressed through the openings 26a for positioning within seats 26. Connecting means E are provided in the form of a pair of oppositely spaced posts carried by each of the disks for reception in openings 27 which are spaced opposite respective posts for reception thereof securing each pair of disks into a pair of roller receiving members constituting the bearing cage when the bearing cages are thus assembled and positioned in back to back relation. A central opening 28 is provided in the disks for receiving the shaft and inner race. The rollers may be peripherally inserted therein so that the seats 26 are aligned to receive the double roller members B. When the rollers B have been thus positioned in circumferentially spaced relationship, the entire bearing cage and rollers become an assembly which may be inserted upon the shaft and retained thereon by the sealing element C.

It is thus seen that a drawing roller assembly has been provided which is readily capable of assembly and disassembly and which possesses a long cylindrical yarn handling surface with minimal deviation from proper axial alignment. Since the sealing means thus contemplates the use of a metallic sealing ring between molded plastic surfaces, the bearings also being provided with molded plastic inner and outer races, lubrication is not required.

While a preferred embodiment of the invention has been described using specific terms, such description is for illustrative purposes only, and it is to be understood that changes and variations may be made without departing from the spirit or scope of the following claims.

What is claimed is:

1. An assembly for mounting a textile drafting roll on a shaft for use on a spinning frame and the like, comprising:
   a sleeve carrying said roll thereon having;
   a bearing race intermediate internally enlarged end portions;
   a plurality of circumferentially spaced roller bearings carried within said bearing race each having;
   a pair of spaced aligned rollers separated by an enlarged intermediate portion; and
   sealing means carried within said enlarged end portions retaining said roller bearings within said bearing race and excluding dirt and lint therefrom.

2. The structure set forth in claim 1 including, a bearing cage for positioning said roller bearings having a pair of retaining disk members with circumferentially spaced seats for rotatably mounting each roller adjacent its ends, connecting means for assembling respective pairs of retaining disk members, a disk member of each pair being in back to back relation intermediate said rollers when positioning said roller bearings, and said seats opening at the outer periphery of the disks for receiving said bearing members.

3. In an assembly having a pair of axially spaced rows of rollers for mounting a textile drafting roll for rotation on a shaft, a molde plastic bearing cage comprising:
   a pair of opposed retaining disk members for rotatably mounting the ends of each row of rollers;
   a plurality of spaced seats within said disks for receiving said rollers adjacent their ends in axial spaced alignment;
   said seats having a restricted opening in the outer periphery of said disk members for receiving said rollers;
   a disk member of each pair being in back to back relation intermediate said rollers when positioning said roller bearings, and
   connecting means for connecting respective pairs of restraining disk members.

4. The structure set forth in claim 3, including longitudinally spaced rollers integrally connected therebetween by an enlarged shaft portion, and an outwardly extending enlarged stub shaft carried by each roller for reception through said restricted openings into said seats.

5. An assembly for mounting a textile drafting roll for rotation on a shaft comprising:
   a pair of axially spaced rows of rollers circumferentially spaced about said shaft;
   a molded bearing cage removably receiving said rollers in the outer periphery thereof; and
   a molded sealing element receivable upon said shaft fixed thereon against rotation on each side of said bearing cage retaining said rollers and excluding dirt and lint therefrom.

6. In an assembly having bearing means for mounting a textile drafting roll for rotation on a shaft of polygonal cross section, a molded sealing element comprising:
   a longitudinal bore having internal abutments for fixing said sealing element against rotation on said shaft;

an inwardly extending flange receivable upon said shaft having an annular inner race for said bearing means; and an annular radially extending flange for retaining said bearing means and excluding dirt and lint therefrom.

7. An assembly for mounting a textile drafting roll for rotation on a shaft comprising:
   a roll carrying sleeve having a bearing race between internally enlarged end portions;
   bearing means carried within said bearing race;
   sealing means carried within said enlarged end portions retaining said bearing means within said bearing race and excluding dirt and lint, said sealing means including,
   an annular radially extending flange fixed to said shaft carried within each of said internally enlarged end portions; and
   a sealing ring carried adjacent the outer periphery of said flange between the flange and said bearing race.

8. The structure set forth in claim 7 wherein said radially extending flange converges outwardly and an inwardly facing seat adjacent the periphery of said flange for receiving said ring.

9. The structure set forth in claim 8 including an internally threaded axial bore in an end of said shaft, an outwardly extending flange carried by said sealing means, and an externally threaded cap screw received by said threaded bore for retaining said assembly on said shaft.

10. An assembly for mounting a textile drafting roll for rotation comprising:
    a shaft of polygonal cross section;
    a roll carrying sleeve having an internal bearing race;
    bearing means carried within said bearing race;
    a sealing element receivable upon said shaft fixed thereon against rotation on each side of said bearing means retaining said bearing means within said bearing race and excluding dirt and lint therefrom; and
    said sealing element including an inwardly extending flange receivable upon said shaft having an annular inner race for said bearing means.

11. An assembly for mounting a textile drafting roll for rotation comprising:
    a shaft of polygonal cross section;
    a roll carrying sleeve having a bearing race between internally enlarged end portions;
    circumferentially spaced roller bearings carried within said bearing race;
    a molded sealing element receivable upon said shaft fixed thereon against rotation on each side of said roller bearings each including;
    an inwardly extending flange receivable upon said shaft having an annular inner race for said roller bearings; and
    an annular radially extending flange extending within each of said internally enlarged end portions.

12. A top roll assembly comprising:
    a shaft;
    a cot carrying molded plastic sleeve carried adjacent each end of said shaft including;
    a bearing race between internally enlarged end portions;
    circumferentially spaced roller bearings carried within said bearing race; and
    a molded plastic sealing element receivable upon said shaft fixed thereon against rotation on each side of said roller bearings each including;
    an annular radially extending flange extending within each of said internally enlarged end portions.

13. The structure set forth in claim 12 including a metallic sealing ring carried within said enlarged end portions between said bearings race and said flange.

14. The structure set forth in claim 12 including an inwardly extending flange receivable upon said shaft having an annular inner race, and wherein said roller bearings are a double row of rollers.

* * * * *